(12) United States Patent
Maeng (10) Patent No.: US 8,758,930 B2
(45) Date of Patent: Jun. 24, 2014

(54) SECONDARY BATTERY HAVING A SHORT INDUCTION PLATE

(75) Inventor: Sooyeon Maeng, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 352 days.

(21) Appl. No.: 12/700,616

(22) Filed: Feb. 4, 2010

(65) Prior Publication Data

US 2010/0316905 A1 Dec. 16, 2010

(30) Foreign Application Priority Data

Jun. 16, 2009 (KR) ........................ 10-2009-0053487

(51) Int. Cl.
*H01M 2/34* (2006.01)

(52) U.S. Cl.
USPC .......................................... 429/163; 429/176

(58) Field of Classification Search
None
See application file for complete search history.

(56) References Cited

U.S. PATENT DOCUMENTS

| | | | |
|---|---|---|---|
| 5,654,114 A * | 8/1997 | Kubota et al. | 429/338 |
| 5,783,326 A * | 7/1998 | Hasebe | 429/57 |
| 6,393,892 B1 | 5/2002 | Ohbayashi et al. | |
| 2003/0077484 A1 | 4/2003 | Cho | |
| 2005/0266292 A1* | 12/2005 | Kim et al. | 429/34 |
| 2005/0287429 A1* | 12/2005 | Cho et al. | 429/161 |
| 2006/0105238 A1* | 5/2006 | Woo | 429/180 |
| 2007/0166605 A1 | 7/2007 | Meguro et al. | |
| 2008/0107957 A1* | 5/2008 | Meguro et al. | 429/56 |
| 2009/0068550 A1* | 3/2009 | Uh et al. | 429/82 |
| 2010/0136415 A1* | 6/2010 | Ahn et al. | 429/162 |

FOREIGN PATENT DOCUMENTS

| | | |
|---|---|---|
| JP | 11-073941 | 3/1999 |
| JP | 2001-133472 | 5/2001 |
| JP | 2001-338636 A | 12/2001 |
| JP | 2003-178745 | 6/2003 |
| JP | 2007-214106 | 8/2007 |
| JP | 2008-41264 A | 2/2008 |
| KR | 10-2006-0087002 | 8/2006 |
| KR | 10-2006-0102753 | 9/2006 |
| KR | 10-2006-0111844 | 10/2006 |

OTHER PUBLICATIONS

European Search Report dated Sep. 28, 2010 for European Application 10163128.1-1227, 4 pages.
English Machine Translation of JP 2008-041264 A.
Machine English Translation of JP 11-073941, 8 pages.
Machine English Translation of JP 2001-338636A, 8 pages.

* cited by examiner

*Primary Examiner* — Ula C Ruddock
*Assistant Examiner* — Tony Chuo
(74) *Attorney, Agent, or Firm* — Christie, Parker & Hale, LLP (57) ABSTRACT

A secondary battery including an electrode assembly having a top and a bottom, a case containing the electrode assembly and comprising a bottom plate, wherein the bottom of the electrode assembly is proximate the bottom plate, a cap assembly coupled to the case, and a short induction plate between the electrode assembly and the case, the short induction plate adapted to fracture when the case is compressed to induce a short of the electrode assembly.

21 Claims, 5 Drawing Sheets

SECONDARY BATTERY HAVING A SHORT INDUCTION PLATE

CROSS-REFERENCE TO RELATED APPLICATION

This application claims priority to and the benefit of Korean Patent Application No. 10-2009-0053487, filed on Jun. 16, 2009, at the Korean Intellectual Property Office, the entire content of which is incorporated herein by reference.

BACKGROUND OF THE INVENTION

1. Field of the Invention

An aspect of the present invention relates to a secondary battery.

2. Description of the Related Art

In general, unlike a primary battery that cannot be recharged, a secondary battery can be discharged and recharged multiple times. Secondary batteries are widely employed in high-technology electronic apparatuses such as cellular phones, laptop computers, camcorders, and the like. In particular, the use of a lithium secondary battery having a high energy density per unit weight and a driving voltage of 3.6V, which is three times larger than that of a nickel-cadmium battery and a nickel-hydrogen battery, is becoming increasingly popular as the power source of electronic apparatuses.

In a lithium secondary battery, a lithium-based oxide is used as a first electrode active material and a carbon material is used as a second electrode active material. The lithium secondary battery is manufactured to have various shapes such as a cylindrical shape, a prismatic shape, and a pouch shape.

In general, the lithium secondary battery includes an electrode assembly, a can accommodating the electrode assembly, and a cap assembly coupled with the can. The lithium secondary battery may present a safety hazard due to a fire or explosion caused by external pressure or shock. Therefore, a lithium secondary battery having an improved safety structure is continuously being developed.

SUMMARY OF THE INVENTION

An aspect of the present invention provides a secondary battery whose safety is improved by inducing a short (i.e., short circuit) between electrode plates in response to external pressure and shock to bypass electric current.

In accordance with an embodiment of the present invention, a secondary battery is provided including an electrode assembly having a top and a bottom, a case containing the electrode assembly and including a bottom plate, wherein the bottom of the electrode assembly is proximate the bottom plate, a cap assembly coupled to the case, and a short induction plate between the electrode assembly and the case, the short induction plate adapted to fracture when the case is compressed to induce a short of the electrode assembly.

In one embodiment, the short induction plate contacts the bottom of the electrode assembly and the bottom plate of the case. Further, the short induction plate may be made of an insulating material such as ceramic, glass, or acryl and may be adapted to be fractured when a force of at least 13 kN is applied to the secondary battery. In one embodiment, the short induction plate has a thickness of between about 0.2 mm to about 2 mm.

In one embodiment, the electrode assembly includes a first electrode plate including a first electrode active material on a first electrode collector, a second electrode plate including a second electrode active material on a second electrode collector, and a separator between the first electrode plate and the second electrode plate, wherein the secondary battery is adapted to generate a short between the first electrode collector and the second electrode collector when the short induction plate is fractured.

In another embodiment, the short induction plate includes a plurality of guide grooves on a surface thereof. Further, each of the plurality of guide grooves may be substantially perpendicular to a longitudinal direction of the short induction plate. In one embodiment, a depth of each of the plurality of guide grooves is between about $1/10$ and about $2/3$ of a thickness of the short induction plate.

In one embodiment, the plurality of guide grooves include a first guide groove on a first surface of the short induction plate and a second guide groove on a second surface of the short induction plate, wherein the first guide groove and the second guide groove are alternately positioned along the longitudinal direction of the short induction plate.

In another embodiment, the secondary battery may further include an insulating case between the electrode assembly and the cap assembly, and the insulation case may include an insulating material and may have a thickness of between about 1.5 mm and about 2.5 mm.

In yet another embodiment, the insulating case includes a first region adapted to be fractured when the case is compressed to induce a short of the electrode assembly and a second region connected to a periphery of the first region, wherein the first region and the second region include different insulating materials.

In one embodiment, the first region is adapted to be fractured when a force of at least 13 kN is applied to the secondary battery and the first region may be made from ceramic, glass, or acryl.

In one embodiment, the insulating case includes a plurality of guide grooves on a first surface of the first region. Each of the plurality of guide grooves may be substantially perpendicular to a longitudinal direction of the first region and a depth of the guide grooves may be between about $1/10$ and about $2/3$ of a thickness of the first region.

BRIEF DESCRIPTION OF THE DRAWINGS

The features of the present invention will be more apparent from the following detailed description in conjunction with the accompanying drawings, in which.

DETAILED DESCRIPTION

Hereinafter, embodiments of the present invention will be described in detail with reference to the accompanying drawings.

Figure 1:
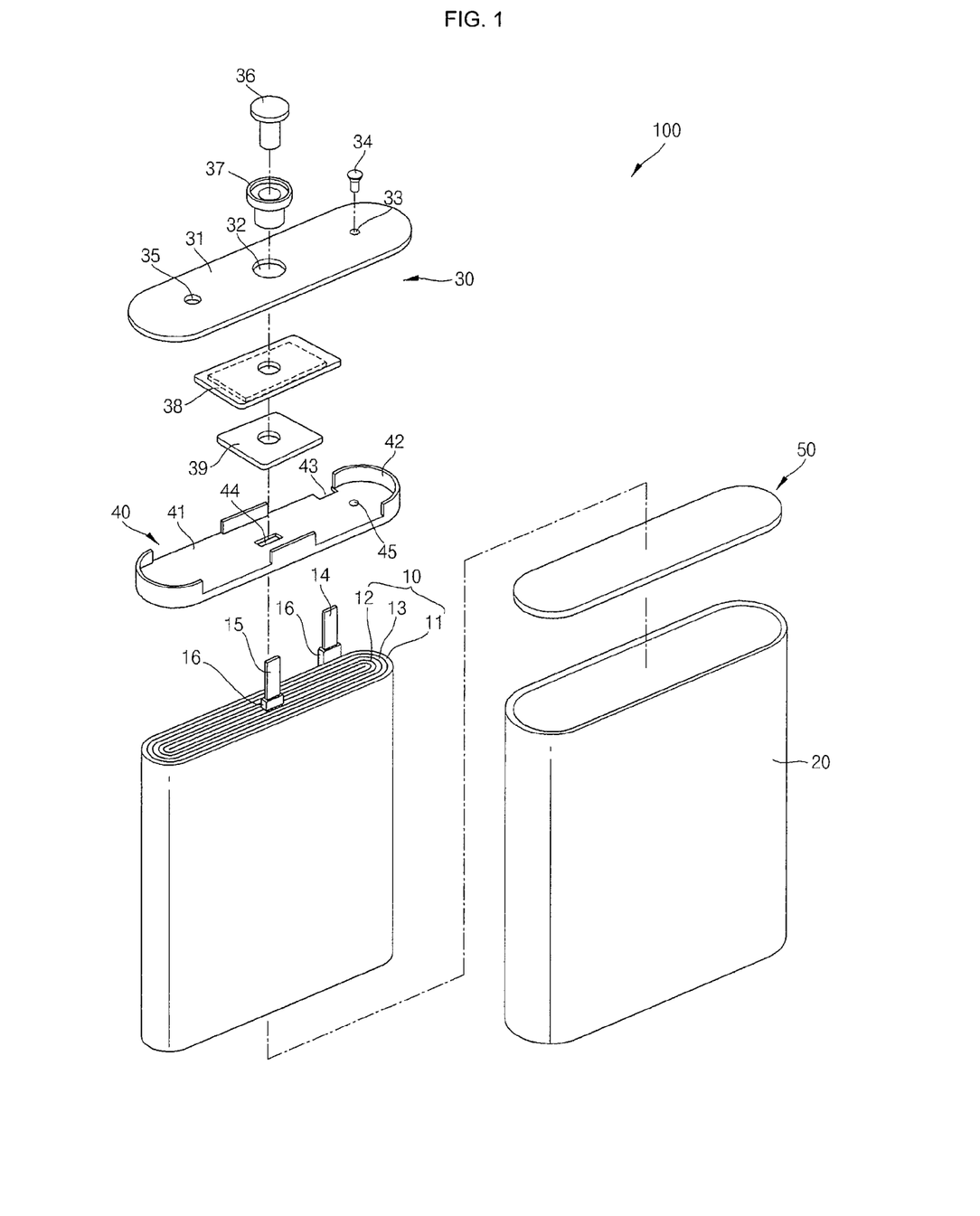
FIG. 1 is an exploded perspective view illustrating a secondary battery according to an embodiment of the present invention.
Figure 2:
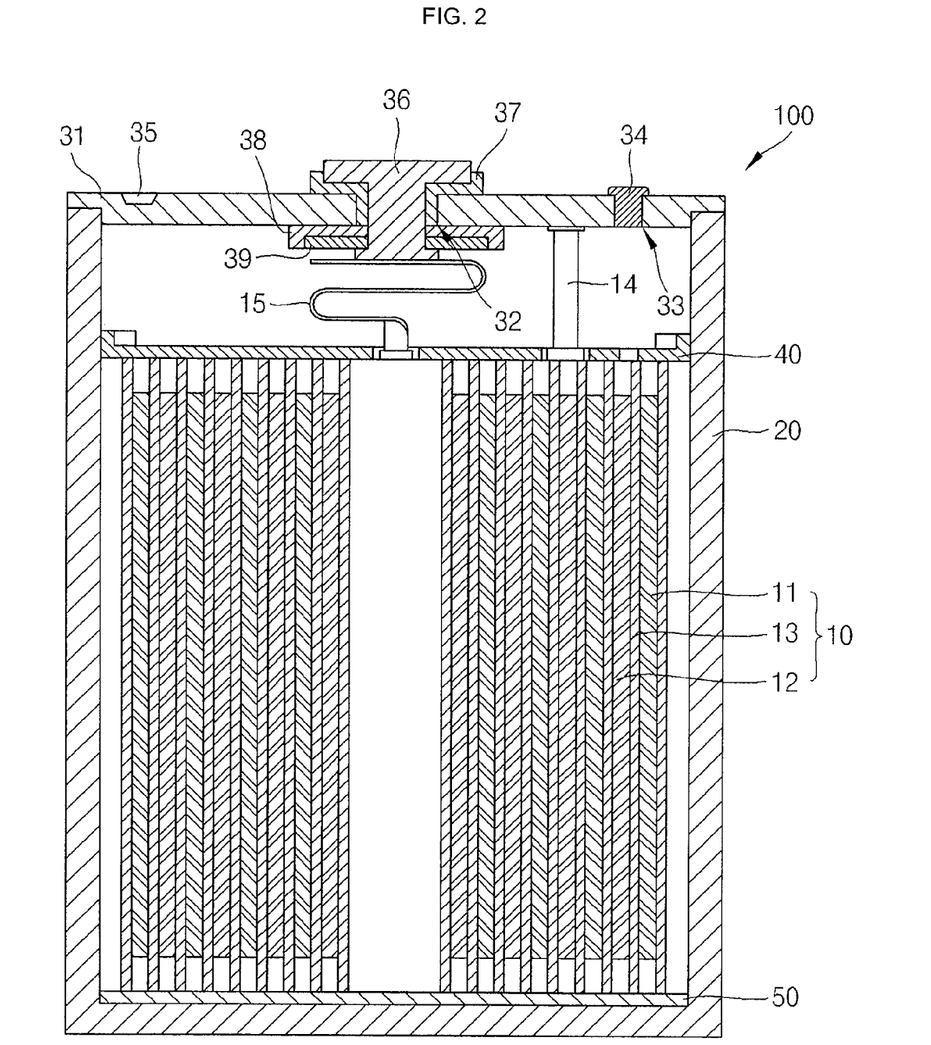
FIG. 2 is a sectional view illustrating an assembly of the secondary battery of FIG. 1.

FIG. 1 is an exploded perspective view illustrating a secondary battery according to an embodiment of the present invention. FIG. 2 is a sectional view illustrating an assembly of the secondary battery of FIG. 1.

Referring to FIGS. 1 and 2, a secondary battery 100 according to an embodiment of the present invention includes an electrode assembly 10, a case 20 accommodating the electrode assembly 10 and electrolyte (not shown), a cap assembly 30 sealing a top opening of the case 20, and an insulating case 40 interposed between the electrode assembly 10 and the cap assembly 30. The secondary battery 100 according to the present embodiment further includes a short induction plate 50 interposed between the electrode assembly 10 and the bottom of the case 20.

The electrode assembly 10 is formed by winding or overlapping a lamination (i.e., a layered structure) of a first electrode plate 11, a separator 13, and a second electrode plate 12 that are thin plates or films. The electrode assembly 10 includes electrode tabs, and specifically, a first electrode tab 14 and a second electrode tab 15.

The first electrode plate 11 may include a first electrode collector made of aluminum foil and a first electrode active material formed on the first electrode collector. Cobalt acid lithium may be used as the first electrode active material.

The second electrode plate 12 may include a second electrode collector made of copper foil and a second electrode active material formed on the second electrode collector. Carbon may be used as the second electrode active material.

The first electrode plate 11 may serve as a positive electrode and the second electrode plate 12 may serve as a negative electrode. The first electrode plate 11 may have a polarity different from that of the second electrode plate 12.

The separator 13 may be made of polyethylene, polypropylene, or a copolymer of polyethylene and polypropylene. Additionally, if the width of the separator 13 is larger than the width of the first electrode plate 11 and the width of the second electrode plate 12, such a structure may be effective to prevent a short between the electrode plates.

The first electrode tab 14 and the second electrode tab 15 extend respectively from the first electrode plate 11 and the second electrode plate 12. Insulating tapes 16 are wound around boundaries of the first electrode tab 14 and the second electrode tab 15 that extend from the electrode assembly 10 to prevent a short between the electrodes.

In one embodiment, the case 20 is a metal can and may be formed by deep drawing. More specifically, the case 20 may be made of a light conductive metal such as aluminum or an aluminum alloy, and the case may serve as an electrode. In one embodiment of the present invention, the case 20 serves as a positive electrode. The case 20 contains the electrode assembly 10 and the electrolyte. The open top of the case 20 through which the electrode assembly 10 is inserted is sealed by the cap assembly 30.

The cap assembly 30 may include a cap plate 31, a stopper 34, a safety vent 35, and an electrode terminal 36.

The cap plate 31 may be made of a metal plate having a size and shape generally corresponding to a size and shape of a top opening of the case 20. The cap plate 31 is coupled with the case by welding, for example, to serve as the same electrode as the case 20, that is, the positive electrode. A terminal through hole 32 may be formed at the center of the cap plate 31. An electrolyte injection hole 33 may be formed near one end of the cap plate 31.

The stopper 34 is provided to seal the electrolyte injection hole 33 after the electrolyte is injected into the case 20 through the electrolyte injection hole 33. The stopper 34 is formed of a ball-shaped material made of aluminum or an aluminum-containing metal. The stopper 34 is mechanically press fitted into the electrolyte injection hole 33 to be coupled with the electrolyte injection hole 33.

The safety vent 35 may be formed near the other end of the cap plate 31 from the electrolyte injection hole 33 to secure the safety of the battery by discharging internal gas when the internal pressure of the case 20 increases due to overcharge. Since the safety vent 35 is thinner than the other parts of the cap plate 31, the safety vent fractures before the rest of the cap plate to exhaust the internal gas when internal pressure increases.

The electrode terminal 36 passes through the cap plate 31 through the terminal through hole 32. A tube-shaped gasket 37 is installed on the external surface of the electrode terminal 36 to insulate the electrode terminal 36 from the cap plate 31. An insulating plate 38 is installed on the bottom of the cap plate 31, and a terminal plate 39 is installed on the bottom of the insulating plate 38. The bottom of the electrode terminal 36 is electrically connected to the terminal plate 39. The electrode terminal 36 is electrically connected to the second electrode plate 12 of the electrode assembly 10 through the second electrode tab 15 of the electrode assembly 10. Additionally, the first electrode plate 11 of the electrode assembly 10 is electrically connected to the cap plate 31 through the first electrode tab 14.

The insulating case 40 may be made of an insulating material, for example, one selected from polypropylene (PP), polyphenylenesulfide (PPS), polyethersulfone (PES), and denatured polyphenyleneoxide (PPO) or a combination thereof. The insulating case 40 prevents an electric short between the electrode assembly 10 and the cap assembly 30 and supports and fixes the first electrode tab 14 and the second electrode tab 15. Here, the insulating case 40 may have a thickness of between about 1.5 mm and about 2.5 mm. This is because the strength of the insulating case 40 deteriorates when the thickness of the insulating case 40 is smaller than 1.5 mm and because the amount of the insulating material of which the insulating case 40 is formed excessively increases when the thickness of the insulating case 40 is larger than 2.5 mm.

To be specific, the insulating case 40 may include a body 41, a support wall 42, electrode tab outlets 43 and 44, and an electrolyte inlet 45.

The body 41 is made of a plate having a size and shape suitable to be inserted into the case 20.

The support wall 42 protrudes from the edge of the body 41 in an upward direction by a preset height. The support wall 42 stably supports the body 41 and improves adhesion force between the insulating case 40 and the inner wall of the case 20 when the insulating case 40 is accommodated in the case 20 to prevent the insulating case 40 from moving. In addition, the support wall 42 improves the strength of the insulating case 40 to prevent the body 41 from being deformed when a physical shock is applied to the secondary battery 100. The support wall 42 may be integral to the body 41.

The electrode tab outlets 43 and 44 are formed in the body 41 to provide channels through which the first and second electrode tabs 14 and 15 may protrude through the body 41.

The electrolyte inlet 45 is formed in the body 41 to provide a channel through which the electrolyte is introduced into the electrode assembly 10 via the body 41.

The short induction plate 50 has a size such that the short induction plate 50 can be inserted onto the internal bottom plate of the case 20 and is positioned to contact the bottom of the electrode assembly 10 and the internal bottom plate of the case 20. The short induction plate 50 is broken or fractured when a threshold or preset pressure or shock is applied to the secondary battery 100 (that is, when the case 20 is compressed) to damage the separator positioned on the bottom of the electrode assembly 10 and to induce a short (e.g., a minute short) between the first electrode collector of the first electrode plate 11 and the second electrode collector of the second electrode plate 12. By doing so, the short induction plate 50 may allow to bypass electric current through a current pass channel between metals which is formed by a short between the electrode collectors. Accordingly, a short is generated between the first electrode plate 11 and the second electrode plate 12 in response to a preset external pressure or shock applied to the secondary battery 100 and current flows. As a result, the short induction plate 50 may minimize or reduce the generation of heat to prevent a fire or explosion.

To this end, the short induction plate 50 may be made of an insulating material that may be fractured by a preset external pressure or shock applied to the secondary battery 100. The short induction plate 50 is made of the insulating material to prevent an electric short between the case 20 serving as a first electrode and the second electrode plate 12 of the electrode assembly 10. If the short induction plate 50 were made of a metal, the short induction plate 50 would serve as the first electrode collector (for example, a positive electrode collector) in the case 20 serving as the first electrode (for example, the positive electrode). Therefore, when the short induction plate 50 is fractured by the preset external pressure or shock, the short induction plate 50 contacts the second electrode active material (for example, a negative electrode active material) of the second electrode plate 12 to generate a large spark, which is well-known from experiment results to generate fire or an explosion.

A compression test is carried out as a safety test of the secondary battery. The compression test is a method of investigating whether a fire is generated in the secondary battery by compressing the secondary battery in the direction perpendicular to a longitudinal direction and perpendicular to a narrow side surfaces of the secondary battery, wherein the longitudinal direction is the direction parallel to the direction in which the electrode terminal protrudes from the secondary battery. In the compression test, a force of 13 kN is the standard compression pressure used. Therefore, the short induction plate 50 may be made of insulating material adapted to be fractured when a force of at least 13 kN (that is, the standard compression pressure) is applied to the secondary battery. For example, the short induction plate 50 may be made from glass, ceramic, or acryl.

In addition, the short induction plate 50 may have a thickness of between about 0.2 mm and about 2 mm. When the thickness of the short induction plate 50 is smaller than 0.2 mm, the short induction plate 50 may be too easily fractured under an undesirably small pressure. When the thickness of the short induction plate 50 is larger than 2 mm, the short induction plate 50 may occupy an undesirably a large space in the case 20.

As described above, the secondary battery 100 according to one embodiment of the present invention includes the short induction plate 50 made of insulating material that may be fractured by a preset external pressure or shock. Therefore, a short between the first electrode collector of the first electrode plate 11 and the second electrode collector of the second electrode plate 12 may be induced when the preset external pressure or shock is applied and the current may be bypassed through the current pass channel between metals which is formed by the short between the electrode collectors. Therefore, in the secondary battery 100 according to one embodiment of the present invention, a short is generated between the first electrode plate 11 and the second electrode plate 12 due to the preset external pressure or shock and current flows, so that the generation of heat may be minimized or reduced to prevent a fire or explosion. Therefore, safety of the secondary battery 100 according to the described embodiment of the present invention may be improved.

Next, a secondary battery according to another embodiment of the present invention will be described.

Figure 3:
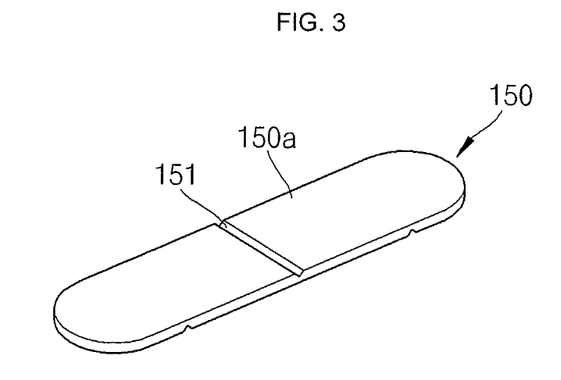
FIGS. 3 and 4 are perspective views illustrating a top and a bottom, respectively, of a short induction plate of a secondary battery according to another embodiment of the present invention.
Figure 4:
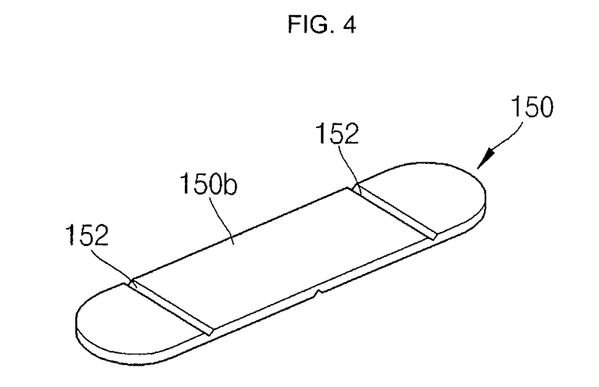
Figure 5:
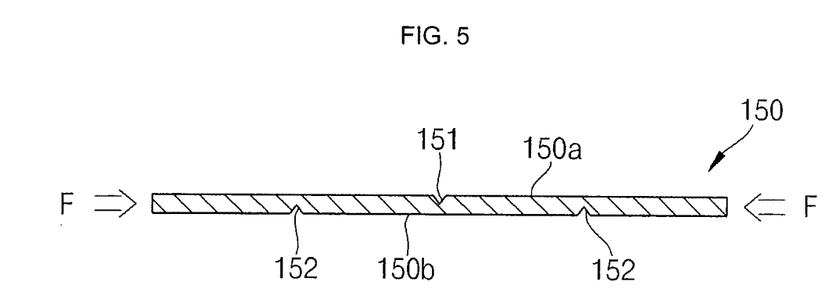
FIG. 5 is a sectional view illustrating the short induction plate of FIGS. 3 and 4.
Figure 6:
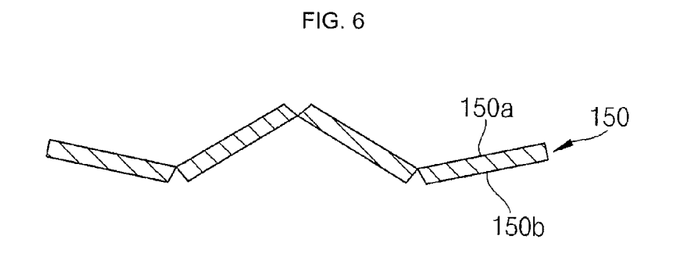
FIG. 6 is a sectional view illustrating the short induction plate of FIG. 5 fractured when the short induction plate is compressed by external pressure.

FIGS. 3 and 4 are perspective views illustrating the top and the bottom, respectively, of a short induction plate of a secondary battery according to another embodiment of the present invention. FIG. 5 is a sectional view illustrating the short induction plate of FIGS. 3 and 4. FIG. 6 is a sectional view illustrating the short induction plate of FIG. 5 fractured when the short induction plate is compressed by external pressure.

The secondary battery according to the present embodiment includes substantially the same elements and performs substantially the same function as the secondary battery 100 illustrated in FIGS. 1 and 2 except that guide grooves 151 and 152 are formed in a short induction plate 150. Therefore, in the present embodiment, description of the same elements will be omitted and only the short induction plate 150 will be described.

Referring to FIGS. 3 to 5, the short induction plate 150 may be made from the same material and performs the same function as the short induction plate 50 illustrated in FIGS. 1 and 2. The short induction plate 150 includes the guide grooves 151 and 152 formed on the surface of the short induction plate 150.

The guide grooves 151 and 152 may be formed in the direction perpendicular to the longitudinal direction of the short induction plate 150. The guide grooves 151 and 152 serve as the fracturable or fragile parts of the short induction plate 150 and may allow the short induction plate 150 to be more easily fractured by the preset external pressure or shock applied to the secondary battery. The depth of the guide grooves 151 and 152 may be between about $\frac{1}{10}$ and about $\frac{2}{3}$ of the thickness of the short induction plate 150. When the depth of the guide grooves 151 and 152 is less than $\frac{1}{10}$ of the thickness of the short induction plate 150, the effect of functioning as the fragile parts of the short induction plate 150 is small. When the depth of the guide grooves 151 and 152 is larger than $\frac{2}{3}$ of the thickness of the short induction plate 150, the short induction plate 150 is fractured by an undesirably small pressure.

The guide grooves 151 and 152 may be classified into a first guide groove 151 formed on a top surface 150a of the short induction plate 150 and a second guide groove 152 formed on the bottom surface of the short induction plate 150.

The first guide groove 151 and the second guide groove 152 may be alternately positioned in the longitudinal direction of the short induction plate 150. Therefore, when the preset external pressure or shock is applied to the secondary battery, that is, when a force F is applied to the side of the short induction plate 150 of FIG. 5, as illustrated in FIG. 6, the pieces of the short induction plate 150 project into the direction of the electrode assembly 10 (that is, the bottom of the electrode assembly 10) in a preset shape so that the bottom of the electrode assembly (10 of FIG. 1) is focusedly damaged.

As described above, the secondary battery according to this embodiment of the present invention includes the short induction plate 150 having guide grooves 151 and 152 so that the short induction plate 150 may be easily fractured at the guide grooves 151 and 152 when the preset external pressure or shock is applied. Therefore, in the secondary battery according to this embodiment of the present invention, a short between the first electrode collector of the first electrode plate 11 and the second electrode collector of the second electrode plate 12 of the electrode assembly (10 of FIG. 1) is effectively induced when the preset external pressure and shock are applied to bypass current through the current pass channel between metals.

Next, a secondary battery according to still another embodiment of the present invention will be described.

Figure 7:
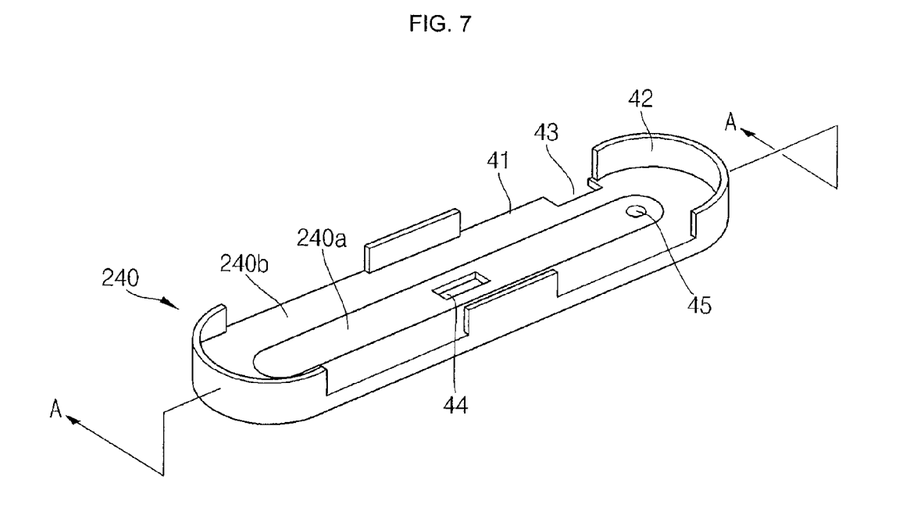
FIG. 7 is a perspective view illustrating an insulating case of a secondary battery according to still another embodiment of the present invention.
Figure 8:
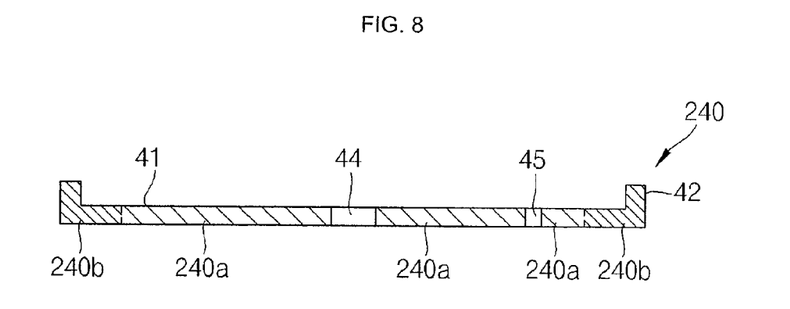
FIG. 8 is a sectional view of the insulating case taken along the line A-A of FIG. 7.

FIG. 7 is a perspective view illustrating an insulating case of a secondary battery according to still another embodiment of the present invention. FIG. 8 is a sectional view of the insulating case taken along the line A-A of FIG. 7.

The secondary battery according to this embodiment includes substantially the same elements and performs substantially the same function as the secondary battery 100 illustrated in FIGS. 1 and 2 except that an insulating case 240 includes the first region 240a and the second region 240b divided in accordance with materials from which the regions are formed. Therefore, this embodiment of the present invention, description of the same elements will be omitted and only the insulating case 240 will be described.

Referring to FIGS. 7 and 8, the insulating case 240 has the same shape as that of the insulating case 40 illustrated in FIG. 1. The insulating case 240 is divided into a first region 240a and a second region 240b made from different insulating materials.

The first region 240a may be formed of the same insulating material as that of the short induction plate 50 illustrated in FIGS. 1 and 2. Therefore, the first region 240a is fractured when a preset external pressure or shock is applied to the secondary battery to damage the separator positioned on the electrode assembly (10 of FIG. 1) and to induce a short between the first electrode collector of the first electrode plate (11 of FIG. 1) and the second electrode collector of the second electrode plate (12 of FIG. 1). Thus, the first region 240a may bypass current through the current pass channel between metals. Therefore, a short is generated between the first electrode plate 11 and the second electrode plate 12 of the electrode assembly (10 of FIG. 1) by the preset external pressure or shock applied to the secondary battery and current flows. As a result, the first region 240a minimizes or reduces the generation of heat to prevent a fire or explosion.

The second region 240b is connected to the periphery of the first region 240a and may be formed of the insulating material used to form the insulating case 40 of FIG. 1.

As described above, the secondary battery according to the present embodiment includes the short induction plate (50 of FIG. 1 or 150 of FIG. 3) and the insulating case 240 formed of the insulating material that may be partially fractured by a preset external pressure or shock so that the portion of the separator positioned above and below the rest of the electrode assembly (10 of FIG. 1) is damaged by the insulating case 240 and the short induction plate (50 or 150) and a short between the first collector of the first electrode plate 11 and the second collector of the second electrode plate 12 is effectively induced. Therefore, in the secondary battery according to this embodiment of the present invention, current is bypassed through the current pass channel between metals.

Next, a secondary battery according to still another embodiment of the present invention will be described.

Figure 9:
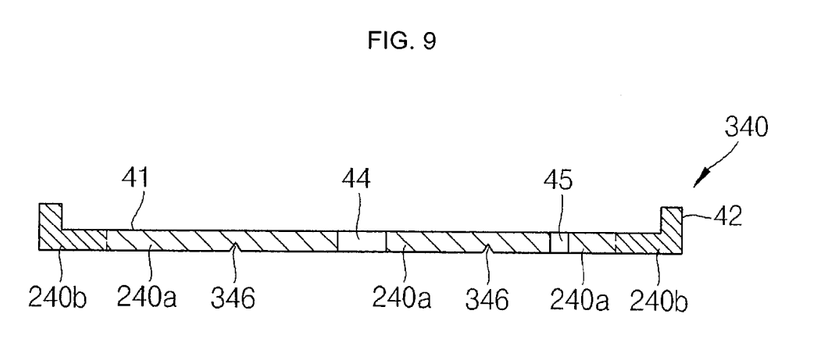
FIG. 9 is a sectional view illustrating an insulating case of a secondary battery according to still another embodiment of the present invention.

FIG. 9 is a sectional view illustrating an insulating case of a secondary battery according to still another embodiment of the present invention.

The secondary battery according to this embodiment includes substantially the same elements and performs substantially the same function as the secondary battery 100 illustrated in FIGS. 1 and 2 except that an insulating case 340 includes a first region 240a and a second region 240b divided in accordance with materials from which the regions are formed and guide grooves 346. Therefore, in this embodiment, description of the same elements will be omitted and only the insulating case 340 will be described.

Referring to FIG. 9, the insulating case 340 has the same shape as the insulating case 40 illustrated in FIG. 1. The insulating case 340 is divided into a first region 240a and a second region 240b having different insulating materials like the insulating case 240 illustrated in FIGS. 7 and 8. The insulating case 340 further includes guide grooves 346 similar to the guide grooves 152 described above with respect to the insulating case 240 illustrated in FIGS. 7 and 8.

The guide grooves 346 may be formed in the direction perpendicular to the longitudinal direction of the first region 240a on the bottom surface of the first region 240a. The guide grooves 346 serve as the fragile parts of the first region 240a and may allow the first region 240a to be easily fractured when a preset external pressure or shock is applied to the secondary battery. The guide grooves 346 are formed on the bottom surface of the first region 240a so that the pieces of the first region 240a that are generated when the first region 240a is fractured project into the direction of the electrode assembly (10 of FIG. 1) (i.e., into the top of the electrode assembly 10). The depth of the guide grooves 346 may be between about $1/10$ and about $2/3$ of the thickness of the first region 240a. When the depth of the guide grooves 346 is less than $1/10$ of the thickness of the first region 240a, the effect of functioning as the fragile parts of the first region 240a may be small. When the depth of the guide grooves 346 is larger than $2/3$ of the thickness of the first region 240a, the first region 240a may be fractured by an undesirably small pressure.

As described above, the secondary battery according to still another embodiment of the present invention includes the insulating case 340 made of the insulating material that may be partially fractured by the preset external pressure or shock and having guide grooves 346, and the short induction plate (50 of FIG. 1 or 150 of FIG. 3). Therefore, top and bottom portions of the separator of the electrode assembly (10 of FIG. 1) may be effectively damaged by the insulating case 340 and the short induction plate (50 or 150) that are easily fractured when the preset external pressure or shock is applied. Therefore, in the secondary battery according to the present embodiment, a short between the first electrode collector of the first electrode plate 11 and the second electrode collector of the second electrode plate 12 is effectively induced to bypass current through the current pass channel between metals.

Although exemplary embodiments of the present invention have been described in detail hereinabove, it should be understood that many variations and modifications of the basic inventive concept herein described which those skilled in the art may develop, will still fall within the spirit and scope of the exemplary embodiments of the present invention as defined by the appended claims and their equivalents.

What is claimed is:

1. A secondary battery comprising:
    an electrode assembly having a top and a bottom, the electrode assembly comprising a first electrode plate, a second electrode plate, and a separator between the first electrode plate and the second electrode plate;
    a case containing the electrode assembly and comprising a bottom plate, wherein the bottom of the electrode assembly is proximate the bottom plate;
    a cap assembly coupled to the case; and
    a short induction plate having substantially planar opposing surfaces, one of each of the substantially planar opposing surfaces directly contacting the bottom of the electrode assembly and the bottom plate of the case, respectively, the short induction plate being separable from the case, being made of a single material, and adapted to fracture when the case is compressed to induce a short of the electrode assembly.

2. The secondary battery of claim 1, wherein the short induction plate comprises an insulating material.

3. The secondary battery of claim 1, wherein the short induction plate is adapted to be fractured when a force of at least 13 kN is applied to the secondary battery.

4. The secondary battery of claim 1, wherein the short induction plate comprises ceramic, glass, or acryl.

5. The secondary battery of claim 1, wherein the short induction plate has a thickness of between about 0.2 mm and about 2 mm.

6. The secondary battery of claim 1, wherein the first electrode plate comprises a first electrode active material on a first electrode collector;
    wherein the second electrode plate comprises a second electrode active material on a second electrode collector; and
    wherein the short induction plate is adapted to generate a short between the first electrode collector and the second electrode collector when the short induction plate is fractured.

7. The secondary battery of claim 1, wherein the short induction plate comprises a plurality of guide grooves on a surface thereof.

8. The secondary battery of claim 7, wherein each of the plurality of guide grooves is substantially perpendicular to a longitudinal direction of the short induction plate.

9. The secondary battery of claim 7, wherein a depth of each of the plurality of guide grooves is between about 1/10 and about 2/3 of a thickness of the short induction plate.

10. The secondary battery of claim 7,
    wherein the plurality of guide grooves comprise:
        a first guide groove on a first surface of the short induction plate; and
        a second guide groove on a second surface of the short induction plate opposite the first surface, and
    wherein the first guide groove and the second guide groove are alternately positioned along the longitudinal direction of the short induction plate.

11. The secondary battery of claim 1, further comprising an insulating case between the electrode assembly and the cap assembly.

12. The secondary battery of claim 11, wherein the insulating case comprises an insulating material.

13. The secondary battery of claim 11, wherein the insulating case has a thickness of between about 1.5 mm and about 2.5 mm.

14. The secondary battery of claim 11, wherein the insulating case comprises:
    a first region adapted to be fractured when the case is compressed to induce a short of the electrode assembly; and
    a second region along a periphery of the first region.

15. The secondary battery of claim 14, wherein the first region and the second region comprise different insulating materials.

16. The secondary battery of claim 14, wherein the first region is adapted to be fractured when a force of at least 13 kN is applied to the secondary battery.

17. The secondary battery of claim 14, wherein the first region comprises ceramic, glass, or acryl.

18. The secondary battery of claim 14, wherein the first electrode plate comprises a first electrode active material on a first electrode collector;
    wherein the second electrode plate comprises a second electrode active material on a second electrode collector; and
    wherein the short induction plate is adapted to generate a short between the first electrode collector and the second electrode collector when the short induction plate is fractured.

19. The secondary battery of claim 14, wherein the insulating case comprises a plurality of guide grooves on a first surface of the first region.

20. The secondary battery of claim 19, wherein each of the plurality of guide grooves is substantially perpendicular to a longitudinal direction of the first region.

21. The secondary battery of claim 19, wherein a depth of the guide grooves is between about 1/10 and about 2/3 of a thickness of the first region.

* * * * *